[54] DISPOSABLE THERMOMETER

[75] Inventor: Saviour S. Pecorella, Howard Beach, N.Y.

[73] Assignee: Becton, Dickinson and Company, East Rutherford, N.J.

[22] Filed: Mar. 13, 1974

[21] Appl. No.: 450,866

[52] U.S. Cl. ............................ 73/356; 73/358
[51] Int. Cl.² .................................... G01K 11/06
[58] Field of Search ...... 73/356, 357, 358; 252/408; 116/114 V, 114.5

[56] References Cited
UNITED STATES PATENTS

| | | | |
|---|---|---|---|
| 3,430,491 | 3/1969 | Gignilliat | 73/358 |
| 3,688,582 | 9/1972 | Gradishar | 73/358 |
| 3,704,985 | 12/1972 | Pickett et al. | 73/358 |

*Primary Examiner*—Herbert Goldstein
*Assistant Examiner*—Anthony V. Ciarlante
*Attorney, Agent, or Firm*—Kane, Dalsimer, Kane, Sullivan and Kurucz

[57] ABSTRACT

A disposable irreversible thermometer is provided. The thermometer comprises a base member, a transparent cover member overlying the base member and a temperature sensitive material carried between the transparent cover member and the base member, the material being meltable at a predetermined temperature. Masks of absorbent material and a vent strip preferably of absorbent material underlie portions of the transparent cover blocking the temperature sensitive material from view through the cover. The base and cover together define a pocket and vent means extending from the pocket to the exterior of the thermometer.

8 Claims, 6 Drawing Figures

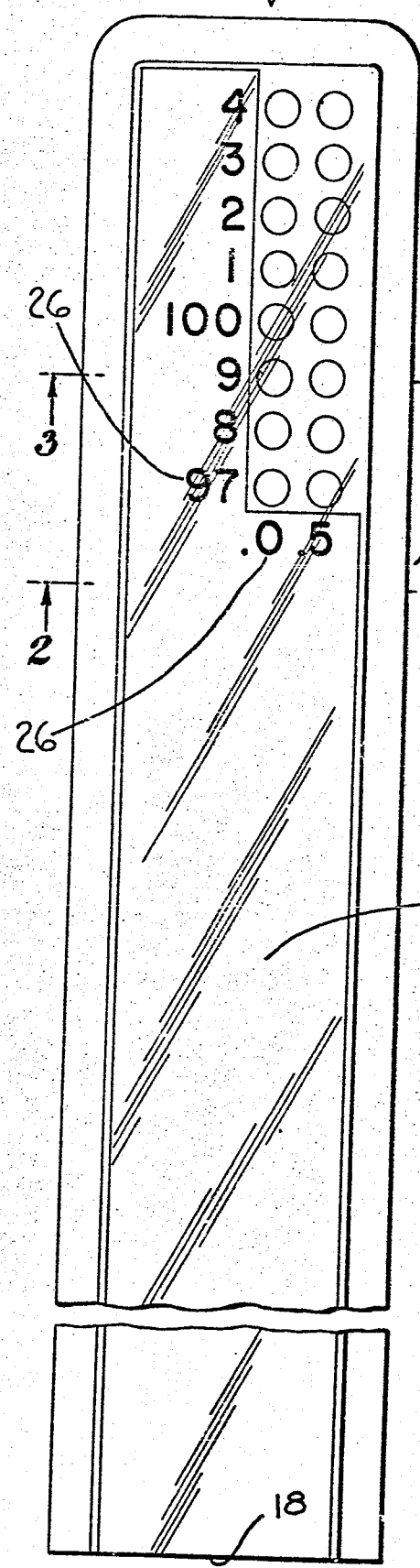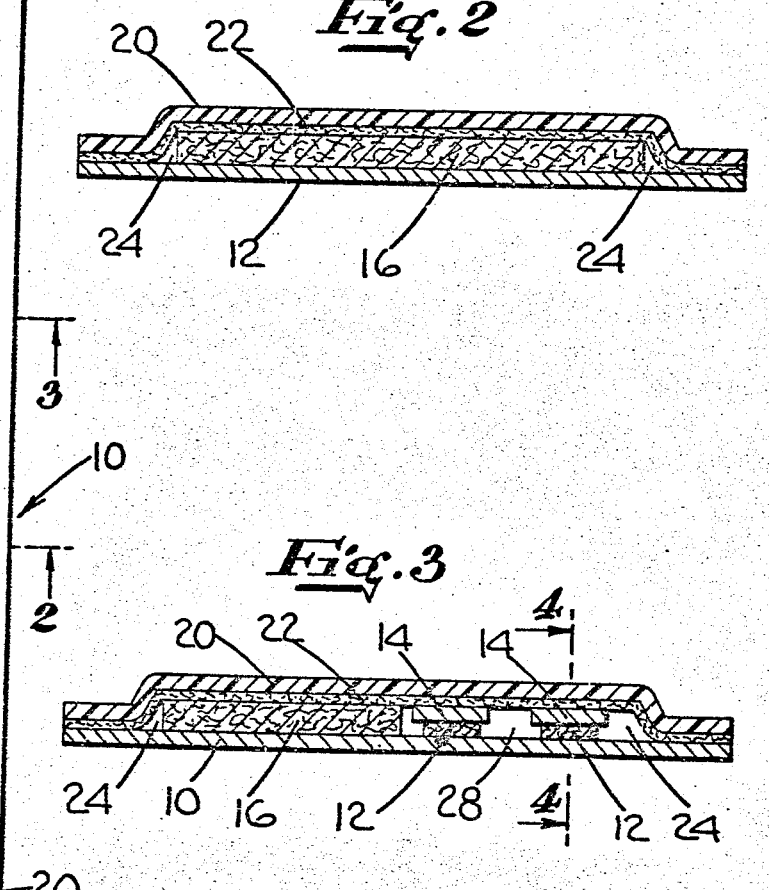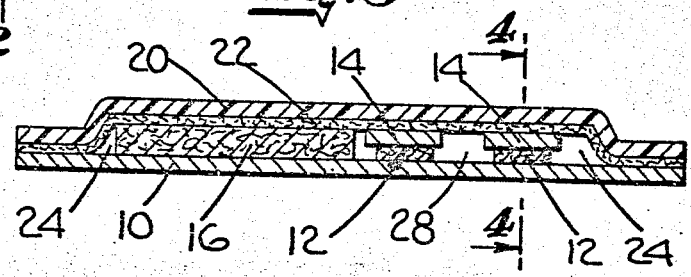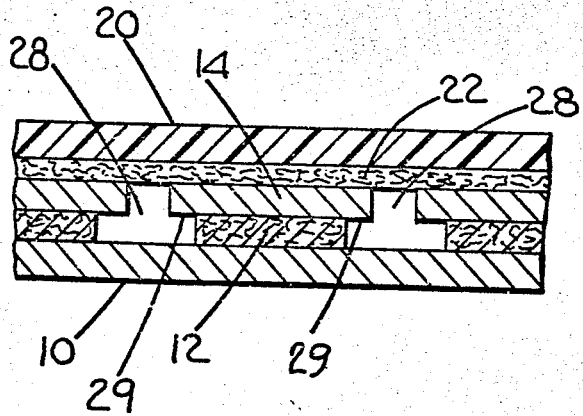

DISPOSABLE THERMOMETER

BACKGROUND OF THE INVENTION

1. Field of the Invention

The present invention relates to clinical thermometers and more particularly to disposable clinical thermometers.

2. Description of the Prior Art

Heretofore, disposable thermometers have been provided comprising a plurality of indicating units mounted on a carrier or base preferably formed of aluminum or some other material having good heat transfer characteristics. These prior art devices were generally covered with a transparent material such as polyethylene which covered at least the top portion and was sealed around the edges to the base or carrier. In some instances, the transparent material covered both top and bottom and was sealed around all edges.

The indicating units of these prior art devices generally comprised a meltable material formulated to melt at predetermined temperatures, an absorbent material adapted to absorb the meltable material when it changed phase and a dye which would go into solution with the meltable material when it changed to a liquid phase. The dye would go into solution, changing the color of the meltable material which would migrate through the absorbent material and the color would appear on the outer surface of the absorbent material thereby providing an indication that the predetermined temperature had been attained.

These prior art devices had two major disadvantages. Firstly, it was determined that if the dye were sufficiently soluble in the melted material, the point at which the material began to melt would be greatly changed, thereby creating an inaccuracy. It was also determined that the amount of dye in solution would affect the rate of melting and therefore when any substantial amount of dye was in solution the melting would not be a sharp action beginning at a particular temperature. Rather, the first indications of melting would take place over a wide temperature range, thereby creating a condition of indefinite temperature measurement and inaccuracy.

The second disadvantage resulted from the formation of air blisters within the thermometer. Since the thermometer was entirely sealed, trapped air or gas within the thermometer would tend to expand or contract with changes in temperature and since the transparent cover was inherently flexible, the heated air would tend to form air blisters in the cover. In many instances, this caused the absorbent material to separate from the meltable material so that when the meltable material melted it was not absorbed into the absorbent material. Correct temperature indication was not provided; therefore, erroneous reading resulted.

In view of the above, it is the principal object of the present invention to provide an improved disposable thermometer of the type described which overcomes the aforementioned problems.

SUMMARY OF THE INVENTION

The above and other beneficial objects and advantages are attained in accordance with the present invention by providing a disposable irreversible thermometer comprising a base member, a transparent cover member overlying the base member and a temperature sensitive material carried between the transparent cover member and the base member, the material being meltable at a predetermined temperature. Masks of absorbent material underlie portions of the transparent cover blocking the temperature sensitive material from view through the cover. A vent strip underlies substantially all other portions of the cover. The base and cover portions together define a pocket and vent means extending from the pocket to the exterior of the thermometer. A substantially insoluble colorant is mixed with the temperature sensitive material so as to render the same more visible when melted and absorbed by the mask.

BRIEF DESCRIPTION OF THE DRAWINGS

In the accompanying drawings:

FIG. 1 is a top plan view of a first embodiment of a thermometer in accordance with the present invention;

FIG. 2 is a sectional view taken along reference lines 2—2 of FIG. 1 in the direction indicated by the arrows;

FIG. 3 is a sectional view taken along lines 3—3 of FIG. 1 in the direction indicated by the arrows;

FIG. 4 is a fragmentary sectional view taken along reference lines 4—4 of FIG. 3 in the direction indicated by the arrows;

DETAILED DESCRIPTION OF THE PREFERRED EMBODIMENT

Figure 5:
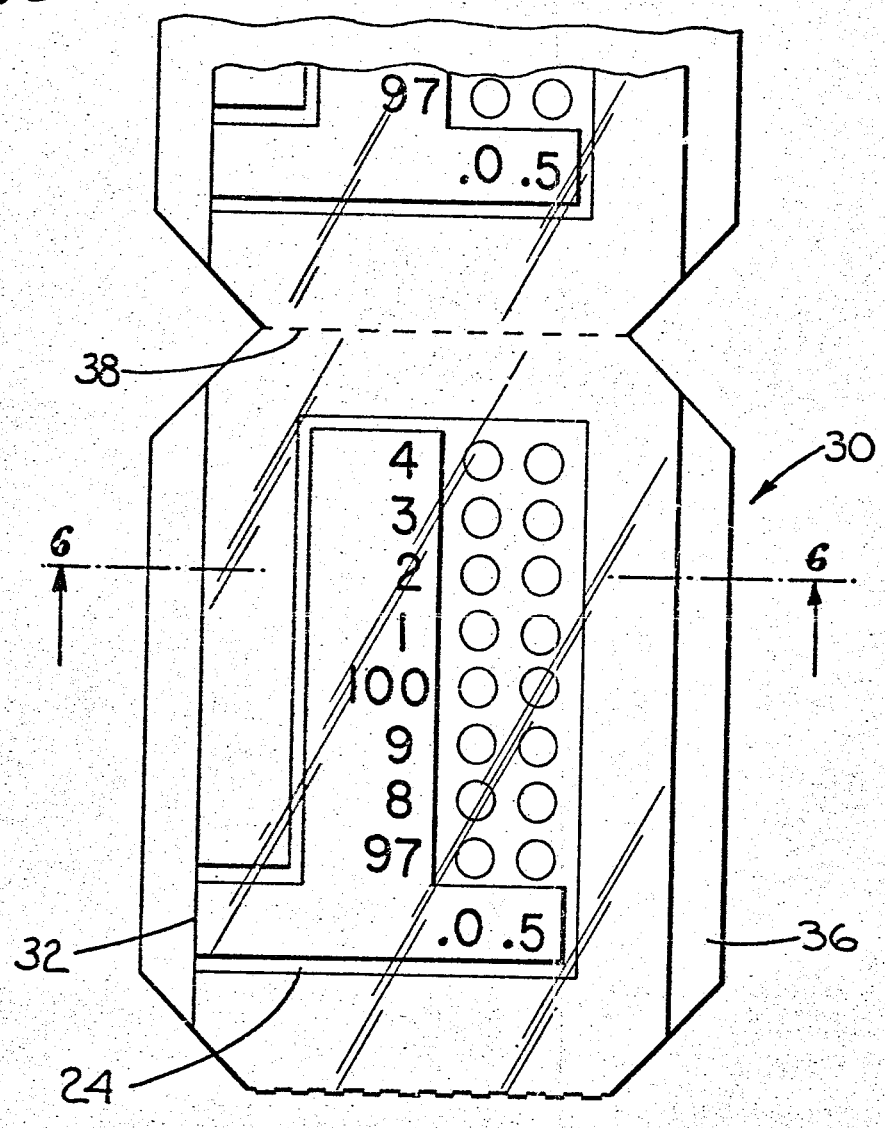
FIG. 5 is a top plan view of a second embodiment of the present thermometer; and, FIG. 6 is a sectional view taken along reference lines 6—6 of FIG. 5 in the direction indicated by the arrows.

Referring to FIGS. 1–4, there is shown a first exemplary embodiment of the present invention which is referred to as a "vented-pocket type" thermometer. The thermometer comprises a base 10 preferably formed of metal such as aluminum or plastic such as polyethylene or a composite of plastic and metal having good heat transfer characteristics. A satisfactory material was found to be aluminum foil having a thickness of substantially 0.006 inch. A number of isolated indicating units 12 are disposed in two rows of eight each on the top surface of base 10. A mask 14 comprising an opaque layer of an absorbent material such as paper overlies each indicating unit 12.

The indicating units comprise a quantity of meltable material to which an insoluble or sparingly soluble colorant is added formulated to melt at a precise determined temperature. The meltable material is chosen so that it is preferably nontoxic, has a sharp melting point and preferably comprises a blend of highly refined normal paraffin hydrocarbons such as n-eicosane and n-docosane which is formulated to melt at a predetermined temperature. As mentioned, a sparingly soluble or insoluble colorant (which for purposes of the remainder of this description will be described as "insoluble colorant") is mixed with the meltable material so as to provide a color indication when the melting point of the material has been attained. A preferred insoluble colorant is Calcophen Red Y or a finely-divided carbon which is insoluble. Various mixtures of the normal paraffin hydrocarbons will provide meltable materials that melt at selected predetermined temperatures.

A vent strip 16, preferably formed of a porous material such as paper, is disposed adjacent the indicating units and extends completely to an open end 18 of the thermometer. The vent strip 16 may be formed of the same material as mask 14. A thin transparent cover 20 overlies the base and is secured to the top surface of the base as well as the top surface of the mask and vent strip by a layer of adhesive 22. The adhesive engages the vent strip and mask over substantially their entire top surfaces and also engages the base about its periphery on three sides leaving only end 18 open.

The invention provides venting means comprising interconnecting voids extending through the porous absorbent materials 14 and 16 as well as vents 24 formed by the space between the transparent cover, the base and the absorbent material 16. The vents extend the length of the thermometer to the open end 18.

In use, the end of the thermometer containing the indicating units is placed in a patient's mouth. The meltable materials of the indicating units are formulated to melt at predetermined temperatures preferably in half-degree intervals. As the meltable material changes phase, it migrates through associated mask 14 changing the color of the mask. Markings 26 indicating the melting points of the various indicating units are set out on the vent strip for view through the transparent cover in registry with the indicating units. For use as a clinical thermometer, the indicating units are selected to melt at half-degree intervals between 97°F and 104°F.

It is to be noted that the indicating units and their associated masks are separated from one another and from the vent strip by space 28 which interconnects with the vent 24. It should also be noted that mask 14 is larger than the meltable material 12 so that a marginal space 29 is provided. The space 29 eliminates any possibility of the interaction of the meltable material of an indicating unit with the adhesive 22.

The venting means enable any air trapped within the thermometer to escape during heating. Without the venting means, the entrapped air would tend to expand upon heating and cause the transparent cover to lift which may, in some cases, result in breaking contact between the meltable material and the absorbent material. Thus, with the venting means, air blisters and the resulting inaccuracy they cause are eliminated.

Another important aspect of the present invention is the use of insoluble or sparingly soluble colorants in the meltable material. Since the colorants do not go into solution to any significant extent, they do not have any adverse effect on the melting point of the meltable materials as was the case in the prior art devices. Thus, it is possible to obtain considerably more accuracy with the present invention than was heretofore possible.

Since the meltable materials of the indicating units will migrate into their associated mask when exposed to their predetermined melting temperatures, it is important that the thermometers be refrigerated or otherwise protected until used.

Figure 6:
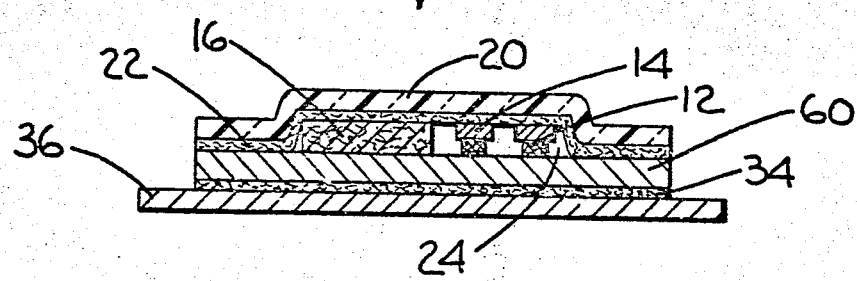

In FIGS. 5 and 6 a slightly different embodiment of the present thermometer is depicted. In this embodiment, a thermometer 30 is provided with an adhesive 22 extending all about the thermometer periphery except for an opening 32 at a side. The vents 24 are both carried to the opening as shown. The thermometer 30 further is provided with a tacky adhesive 34 on the bottom surface of base 10. A release paper 36 underlies adhesive 34 and extends beyond the sides of the thermometer. A plurality of such thermometers are provided on a common strip separated from each other by a series of perforations 38.

In use, a thermometer is separated from the strip of thermometers by tearing along the perforations 38. The release paper 36 is then removed and the thermometer is secured to a portion of the patient's body (such as the patient's abdomen) by means of the tacky adhesive. The patient's body temperature is carried through the base to melt the meltable material 12 in the manner previously described.

Thus, the present invention provides a disposable thermometer that is inexpensive and may be discarded after a single use. The thermometer provides very accurate temperature measurement since the colorant does not go into solution with the meltable material sufficiently to have an adverse effect on the melting point of the material. The thermometer also has venting means so as to prevent the formation of air bubbles or blisters and any resulting inaccuracies. Accordingly, the aforementioned objects are effectively attained.

Having thus described the invention, what is claimed is:

1. A disposable, irreversible thermometer comprising: a base member; a transparent cover member overlying said base member; a temperature sensitive material carried by portions of said base member, said material being meltable at a predetermined temperature; a mask of absorbent material underlying portions of said transparent cover blocking said temperature sensitive material from view through said cover; said base and cover portions together defining a pocket; and means extending from said pocket to the exterior of said thermometer defining a vent for said pocket.

2. The thermometer in accordance with claim 1 wherein said vent means comprises a strip of material underlying substantially the remainder of said transparent cover.

3. The thermometer in accordance with claim 2 wherein said strip is porous.

4. The thermometer in accordance with claim 1 wherein said cover member is secured to said base member along an adhesive perimeter and further comprising an interruption in said perimeter, and said vent means communicates with said interruption.

5. The thermometer in accordance with claim 4 wherein said cover member and base member are generally rectangular and said adhesive perimeter extends about three sides of said rectangular base and said interruption extends along the remaining side.

6. The thermometer in accordance with claim 5 wherein said vent means further includes a space defined between the base, cover and absorbent material, said space being coextensive with at least one side of said rectangular perimeter and in communication with said perimeter interruption.

7. The thermometer in accordance with claim 1 further comprising a substantially insoluble colorant dispersed within said temperature sensitive material.

8. The thermometer in accordance with claim 1 wherein a layer of adhesive underlies said transparent cover member and said mask of absorbent material extends beyond said meltable material to define a marginal space which prevents said meltable material from contacting said adhesive.

* * * * *